BROWN & GODARD.
Corn-Planter.
No 25,380.
Patented Sept. 13, 1859.
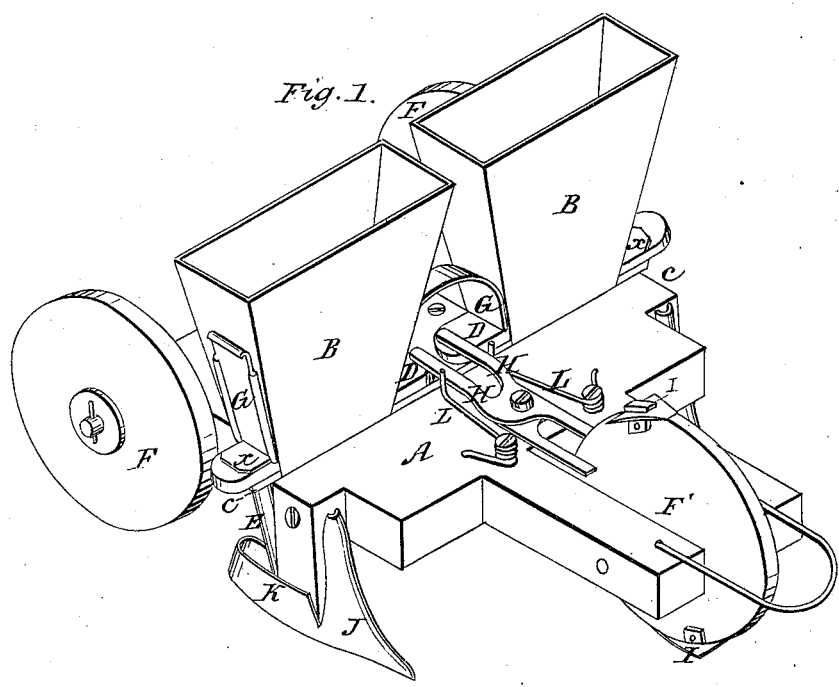
Fig. 1.
Fig. 2.
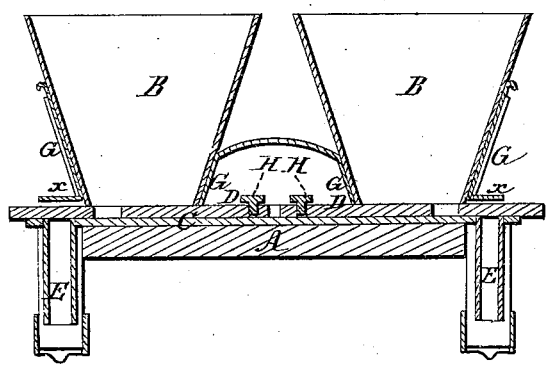
Witnesses:
S. S. Wilder
Fernino W. Bop
Inventors:
Zerah B. Brown
Melvin C. Godard

UNITED STATES PATENT OFFICE.

Z. B. BROWN, OF SIMSBURY, AND M. C. GODARD, OF GRANBY, CONNECTICUT.

IMPROVEMENT IN SEED-PLANTERS.

Specification forming part of Letters Patent No. 25,380, dated September 13, 1859.

*To all whom it may concern:*

Be it known that we, ZERAH B. BROWN, of Simsbury, county of Hartford, and State of Connecticut, and MELVIN C. GODARD, of Granby, county of Hartford, and State of Connecticut, have invented certain new and useful Improvements in Seed-Planters, &c.; and we do hereby declare that the same is described and represented in the following specification and drawings.

To enable others skilled in the art to make and use the same, we will proceed to describe its construction and operation, referring to the drawings, in which the same letters indicate like parts in each of the figures.

The nature of this improvement consists in planting corn and other seeds in double or two rows at a time by means of a suitable frame-work mounted on three wheels, and so arranging and combining the several parts of the machine that the furrow or drill is opened for the reception of the seed, the seed dropped in required quantities and required distance, and effectually covered and stamped by the joint action of the shears and wheels, thus planting two rows at a time and marking the ground by means of a cam projection on the cam-wheel, so as to enable the operator thereby to regulate the rows in an opposite direction, or at right angles with the draft of the machine, all being done in the most perfect manner and with less expense and labor.

In the accompanying drawings is shown the manner of arranging and combining the several parts.

A represents a frame-work or plank platform, to which all the operating parts are attached, mounted upon three wheels, F F F'.

B B are the hoppers.

C is a plate to which the hoppers are secured, and by which they may be easily attached or detached to or from the machine.

E E are the dropping-tubes, secured to the under side of and over the apertures in the plate C, just outside of the hoppers and in front of the wheels F. Said tubes receive and conduct the seed into the drills.

D D are slides or valves, which we propose to make several in number and of various thickness, and having various-size holes to receive the seed, according to the amount of seed required to be dropped at each successive movement of the slides D.

G G are slides made movable on the outer and inner ends of the hoppers, and having a cap, *x*, on the outer ones, projecting outward from the lower end, so as to cover the opening in the slides D and prevent the loss of seed from the upper side and allow of various thickness to be fitted into and used in the hopper for receiving and conveying the required amount of seed from the hopper to the tube E.

H are reciprocal levers made in the form of tongs, the shorter ends extending each side of the wheel F', the longer ends extending back and secured one to one of the slides D and one to the other side D by means of a pivot in the under side and end of said levers. Thus by lifting the end of the levers the slides may be quickly and easily removed and others replaced instead when desired.

L are counter-action springs for keeping the levers in place.

I are cam and marker devices secured at desired intervals on the periphery of the wheel F' in such a manner that they will successively, by their action on the levers H, throw out the slides D, and thus drop the seed into the drill through the tube E, and at the same time mark the ground so as to enable the operator thereby (with suitable care) to form rows in opposite directions.

J are drill-formers, which we propose to secure in an adjustable manner, so as to open a drill more or less in depth, as desired.

K are covering-shares secured directly in rear of the drill-formers, and both the drill-formers and the shares are arranged and secured in front of the wheels F. Thus the wheels F accomplish the double object of supporting and moving the machine, and also of stamping or pressing down the ground over the seed, after the manner of planting seed with a hoe.

Now, we believe we have thus described the arrangement and combination so that a workman skilled can make them therefrom; also that the simplicity of its construction and operation renders it unnecessary for further description. The advantages thus to be derived by this machine over others now in use are its simplicity and cheapness of construction and its efficiency of operation.

We do not claim by itself any distinct part of the machine distinctly, of itself considered; but

What we claim, and desire to secure by Letters Patent, is—

The arrangement and combination of the carrier and stamping wheels F F, cam and marker devices I I upon the wheel F', the reciprocal levers H H, seed slides or valves D D, hoppers B B, drill-formers J J, and covering-shares K K, substantially in the manner as and for the purpose described.

ZERAH B. BROWN.
MELVIN C. GODARD.

Witnesses:
S. I. WILDER,
JERMY W. BLYS.